United States Patent
Sartor et al.

(10) Patent No.: US 9,681,115 B2
(45) Date of Patent: Jun. 13, 2017

(54) IN-PAINTING METHOD FOR 3D STEREOSCOPIC VIEWS GENERATION USING LEFT AND RIGHT IMAGES AND A DEPTH MAP

(75) Inventors: Piergiorgio Sartor, Fellbach (DE); Filippo Rossi, Malo (IT)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 14/233,299

(22) PCT Filed: Jul. 25, 2012

(86) PCT No.: PCT/EP2012/064568
§ 371 (c)(1),
(2), (4) Date: Jan. 16, 2014

(87) PCT Pub. No.: WO2013/014177
PCT Pub. Date: Jan. 31, 2013

(65) Prior Publication Data
US 2014/0146146 A1 May 29, 2014

(30) Foreign Application Priority Data

Jul. 25, 2011 (EP) .................... 11175202

(51) Int. Cl.
H04N 13/00 (2006.01)
G06T 11/00 (2006.01)
H04N 13/04 (2006.01)
(52) U.S. Cl.
CPC ......... *H04N 13/004* (2013.01); *G06T 11/001* (2013.01); *H04N 13/0011* (2013.01); *H04N 13/0402* (2013.01)

(58) Field of Classification Search
CPC ............. H04N 13/004; H04N 13/0011; H04N 13/0402; H04N 13/0271; G06T 11/001
See application file for complete search history.

(56) References Cited

U.S. PATENT DOCUMENTS

| 5,444,487 A | 8/1995 | Kondo et al. |
| 6,192,161 B1 | 2/2001 | Kondo et al. |
| 6,323,905 B1 | 11/2001 | Kondo et al. |

(Continued)

FOREIGN PATENT DOCUMENTS

| CN | 101822068 A | 9/2010 |
| WO | WO 00/27131 A2 | 5/2000 |
| WO | WO 2011/005544 A1 | 1/2011 |

OTHER PUBLICATIONS

Combined Chinese Office Action and Search Report issued May 6, 2015 in Patent Application No. 201280033755.0 (with English translation of categories of cited documents).

(Continued)

*Primary Examiner* — Jay Patel
*Assistant Examiner* — Joseph Suh
(74) *Attorney, Agent, or Firm* — Oblon, McClelland, Maier & Neustadt, L.L.P.

(57) ABSTRACT

A method for generating an intermediate view on the basis of left and right views of a 3D picture and a disparity map, the method including: using pixel information contained in the left and right views and the disparity map for creating an intermediate view, identifying occlusion pixels in the created intermediate view, and filling the occlusion pixels with information gained from adjacent pixels.

13 Claims, 6 Drawing Sheets

(56) References Cited

U.S. PATENT DOCUMENTS

| | | | | |
|---|---|---|---|---|
| 6,529,638 B1* | 3/2003 | Westerman | ............ | H04N 19/86 375/E7.19 |
| 7,710,463 B2 | 5/2010 | Foote | | |
| 2002/0012477 A1* | 1/2002 | Inoue | ........................ | G06T 5/20 382/284 |
| 2002/0019892 A1* | 2/2002 | Kondo | ...................... | G06F 3/13 710/62 |
| 2002/0057373 A1* | 5/2002 | O'Rourke | ................ | H04N 5/21 348/615 |
| 2002/0080139 A1* | 6/2002 | Koo | .................... | G06F 3/04815 345/473 |
| 2003/0156260 A1* | 8/2003 | Putilin | ............... | H04N 13/0497 353/10 |
| 2004/0264599 A1* | 12/2004 | Lliev | .................. | H04L 27/2053 375/298 |
| 2006/0020203 A1* | 1/2006 | Tamura | ...................... | G06T 5/20 600/437 |
| 2006/0061569 A1* | 3/2006 | Yamada | ............... | H04N 13/026 345/422 |
| 2006/0181644 A1* | 8/2006 | De Haan | ................. | G06T 3/403 348/458 |
| 2010/0026712 A1* | 2/2010 | Aliprandi | ........... | H04N 13/0011 345/629 |
| 2010/0103249 A1* | 4/2010 | Lipton | ................ | H04N 13/0022 348/51 |
| 2010/0188482 A1 | 7/2010 | Routhier et al. | | |
| 2010/0194858 A1 | 8/2010 | Lim et al. | | |
| 2010/0215251 A1* | 8/2010 | Klein Gunnewiek | ........ | H04N 13/0022 382/154 |
| 2010/0239180 A1* | 9/2010 | Yea | ......................... | G06T 5/002 382/261 |
| 2010/0277571 A1* | 11/2010 | Xu | ......................... | G06T 7/0057 348/47 |
| 2011/0032341 A1 | 2/2011 | Ignatov et al. | | |
| 2011/0091096 A1* | 4/2011 | Morris | .................... | G03B 19/22 382/154 |
| 2011/0149031 A1* | 6/2011 | Um | ..................... | H04N 13/0011 348/43 |
| 2011/0279645 A1* | 11/2011 | Newton | ............. | H04N 13/0048 348/43 |
| 2011/0280300 A1* | 11/2011 | Tourapis | ............ | H04N 13/0048 375/240.2 |
| 2011/0298895 A1* | 12/2011 | Tian | .................... | H04N 13/0022 348/46 |
| 2012/0069154 A1* | 3/2012 | Talstra | ............... | H04N 13/0048 348/51 |

OTHER PUBLICATIONS

International Search Report issued Sep. 7, 2012 in PCT/EP2012/064568.

H. Hu, et al., "Simultaneous Coding Artifact Reduction and Sharpness Enhancement" Consumer Electronics, ICCE 2007, vol. 5.4-5, XP031071493, Jan. 1, 2007, pp. 1-2.

Ling Shao, et al., "An Overview and Performance Evaluation of Classification-Based Least Squares Trained Filters" IEEE, TIP-03490-2007.R2, Oct. 5, 2007, pp. 1-10.

H. Hu, et al., "Content-adaptive neural filters for image interpolation using pixel classification" Sony Conference, Sep. 1-3, 2004, 11 Pages.

Hao Hu, et al., "Image Interpolation Using Classification-based Neural Networks" IEEE, 2004, pp. 133-137.

M. Zhao, et al., "Content Adaptive Image De-blocking" IEEE, 2004, pp. 299-304.

H. Hu, et al., "Trained Bilateral Filters and Application to Coding Artifacts Reduction" Conference Sep. 16, Oct. 19, 2007, 4 pages.

Hao Hu, et al., "Class-Count Reduction Techniques for Content Adaptive Filtering" Conference, May 25-28, 2009, 5 Pages.

Engin Tola, et al., "Large Occlusion Completion Using Normal Maps" Nov. 8-12, 2010, 14 Pages.

Andre Redert, et al., "An efficient Disparity map format for real time interpolation in multi viewpoint stereoscopic video systems" Dec. 1997, 4 Pages.

C.L. Pagliari, et al., "Reconstruction of Intermediate Views from Stereoscopic Images Using a Rational Filter" IEEE, 1998, pp. 627-631.

Combined Chinese Office Action and Search Report issued May 18, 2016 in Patent Application No. 201280033755.0 (with English translation of categories of cited documents).

Liu Xiangkai, et al., "Improved Depth Image-Based View Synthesis Algorithm" China Academic Journal Electronic Publishing House, Oct. 29, 2009, pp. 56-61 (with English language translation).

* cited by examiner

IN-PAINTING METHOD FOR 3D STEREOSCOPIC VIEWS GENERATION USING LEFT AND RIGHT IMAGES AND A DEPTH MAP

CROSS-REFERENCE TO RELATED APPLICATIONS

The present application claims priority to European Patent Application 11175202.8, filed in the European Patent Office on Jul. 25, 2011 and international patent application PCT/EP2012/064568, filed Jul. 25, 2012, the entire contents of each of which are incorporated herein by reference.

FIELD OF INVENTION

The present invention relates to a method for generating an intermediate view on the basis of left and right views of a 3D picture and a disparity map. The invention also relates to a device for generating an intermediate view, a computer program and a computer readable non-transitory medium.

BACKGROUND OF THE INVENTION

Current 3D stereoscopic technology usually relies on two views, namely left and right views, to generate a 3D impression. There are applications, for example autostereoscopic displays or depth modifications methods, which require to generate views which are between the left and right view or even left to the left view or right to the right view. In order to present the user such views, the system has to generate such a new view.

For generating such a new view, the information from the left view and the right view is used. However, it might be that there are picture areas in the new view which have no corresponding information neither in the left nor in the right view. Such picture areas are referred to as occlusion area or just occlusion. Hence, it is necessary to fill such occlusions with picture information.

BRIEF SUMMARY OF INVENTION

It is an object of the present invention to provide a method and a device for generating an intermediate view on the basis of left and right views of a 3D picture and a disparity map, wherein occlusions in the intermediate view are filled with the proper picture information.

According to an aspect of the present invention there is provided a method for generating an intermediate view on the basis of left and right views of a 3D picture and a disparity map, wherein the method comprises:
  creating an intermediate view by using pixel information contained in the left and right views and the disparity map,
  identifying occlusion pixels in the created intermediate view and
  filling the occlusion pixels with information gained from adjacent pixels.

According to a further aspect of the present invention there is provided a device for generating an intermediate view on the basis of left and right views of a 3D picture and a disparity map, the device comprising a register for storing a number of n pixel values, a filter unit connected to the register and having n filter coefficients, a classification unit connected to the register and for determining a classified value on the basis of the n pixel values, a look-up table unit comprising a plurality of filter coefficient sets and adapted to be addressed by the classified value of the classification unit and to provide a set of n filter coefficients to the filter unit, and a filling unit adapted to fill an occlusion pixel in the intermediate view with the result value of the filter unit.

According to still further aspects a computer program comprising program means for causing a processor to perform the steps of said method according to the present invention, when said computer program is carried out on a processor, as well as computer readable non-transitory medium having instructions stored thereon which, when carried out on a processor, cause the processor to perform the steps of the methods according to the present invention are provided.

Preferred embodiments of the invention are defined in the dependent claims. It shall be understood that the claimed device, the claimed computer program and the claimed computer readable medium have similar and/or identical preferred embodiments as the claimed method and as defined in the dependent claims.

The present invention is based on the idea to fill occlusion pixels with a pixel information gained from adjacent pixels. Hence, the method allows to "create" not existing data, namely pixel data, which however is consistent with the picture content. In the event that two or more occlusion pixels are identified, the method is carried out pixel by pixel, wherein the information of a filled occlusion pixel could be used in following steps to "create" the information for another occlusion pixel.

BRIEF DESCRIPTION OF DRAWINGS

These and other aspects of the present invention will be apparent from and explained in more detail below with reference to the embodiments described hereinafter. In the following drawings

DETAILED DESCRIPTION OF THE INVENTION

The supply and demand of 3D (3-dimensional) picture content, in particular 3D motion picture content, are rapidly increasing and as a result the supply of systems capable of presenting such 3D content is growing. Beside systems requiring 3D glasses, there are already systems on the market which could be used without any particular aid, like 3D glasses. Autostereoscopy is for example a method of displaying stereoscopic images (adding perception of 3D depth) without the use of special headgear or glasses on the part of the viewer. Some of the autostereoscopic systems for example are able to display multiple views so that the display does not need to sense where the viewers eyes are located. That means that the viewer sees different views dependent on the viewing angle with respect to the display.

Since the supplied picture content of e.g. motion pictures generally comprises just a left and right view corresponding to a certain viewing angle relative to the imaged scene, the system has to create further views for different viewing angles. In general, the creation or generation of additional views is possible on the basis of the picture information contained in the supplied left and right views.

However, it might be that in a certain viewing angle, the viewer should see picture content which is not contained in the left and right view.

Figure 1:
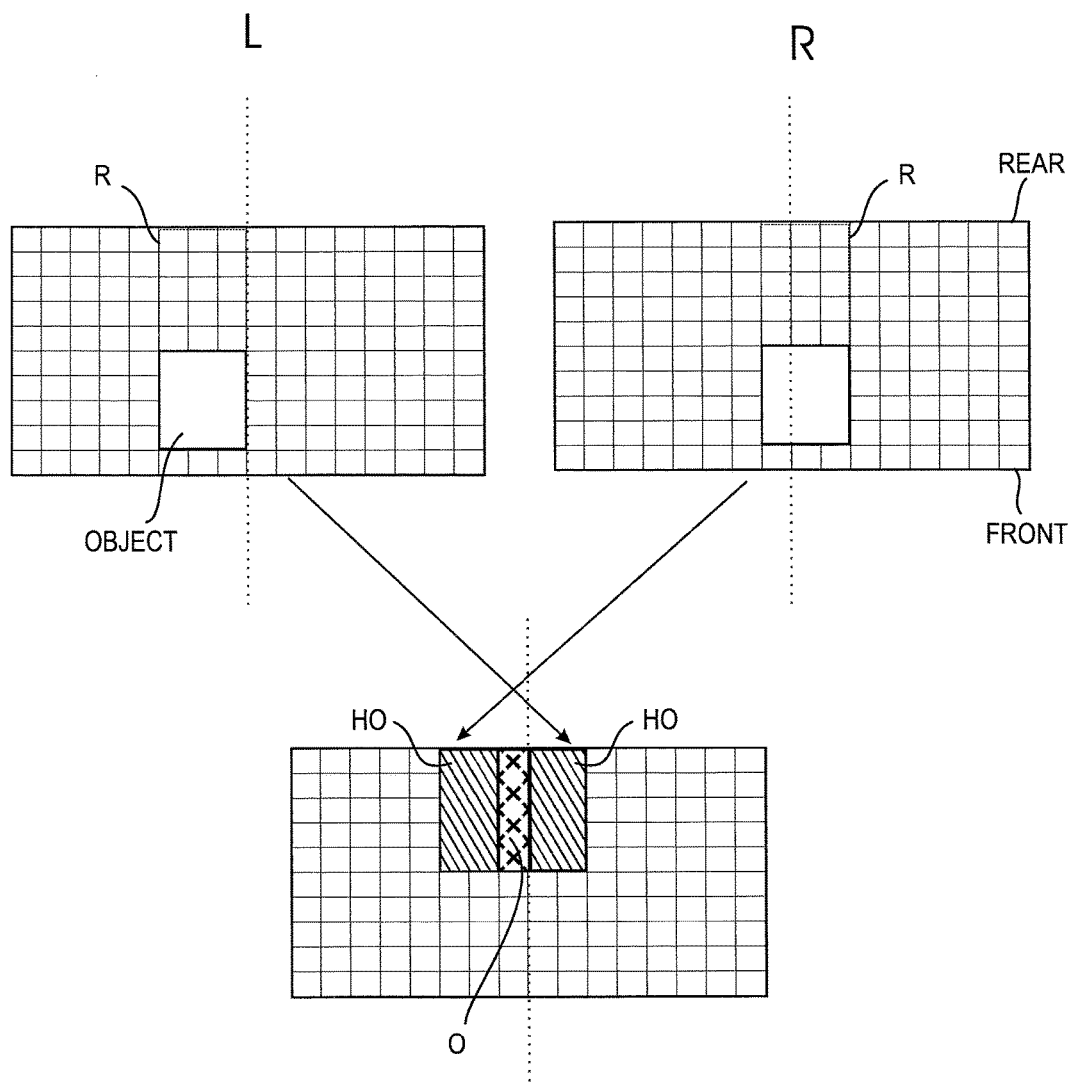
FIG. 1 shows top views of a scene for explaining the expression "occlusion area" and "occlusion pixel"

Such a situation is briefly explained by way of example with reference to FIG. 1. FIG. 1 shows a top view of a scene from which a left and a right view picture is taken. In the scene there is one object which lies—in the left view L—on the left side of the center axis, whereas the object is slightly shifted to the right in the right view. It is generally known that such a shift is necessary to create a perception of 3D depth.

As a result, there is a region R in both views which is behind the object and therefore covered by the object. Therefore, the views do not contain any information about this region R. However, due to the fact that the objects in the left and right views are slightly shifted, the region R in the left view is different to that of the right view.

When creating or generating a new view it might be (dependent on the viewing angle) that the hidden or covered region in the left or right view has to be displayed at least partially.

In this case there are two different cases to be considered. First, the content of a portion of a region R of one view (left or right view) is present in the other view. In FIG. 1 these regions are shown by dashed lines and referenced with HO. The region HO on the left side is contained in the right view and the region HO on the right side is contained in the left view. Such regions are generally called "half occlusion" areas.

The second case relates to areas which are hidden both in the left view as well as the right view. In FIG. 1 this region is indicated with O. Neither the left view nor the right view contains picture information for this region O. Such regions are generally called "occlusion" areas.

In the following there is now described an approach how to "fill" such occlusion regions or areas with picture information gained from adjacent areas so that the information filled in fits to the remaining adjacent picture content.

FIG. 2a shows a matrix of pixels 20 forming a picture to be displayed. It goes without saying that each pixel is represented by a value containing color information etc.

The pixel matrix of FIG. 2a comprises an occlusion area 10 which is surrounded by a dashed line. The respective pixels within this occlusion area 10 are referenced as "occlusion pixels" in the following and have been identified in a former step when generating an intermediate view on the basis of a left and right view, as briefly described with reference to FIG. 1. Hence, no information could be gained from the left and right views with respect to the occlusion pixels. In the event that this view would be displayed, the viewer would recognize this occlusion area as for example a black area (which is just an example), that is a region which does not fit to the picture content surrounding the occlusion area.

Therefore, it is necessary to fill each pixel within the occlusion area 10, that is each occlusion pixel 11 with pixel information.

In FIG. 2a, there is one pixel 12 which is shown as a black square. In the present example, this pixel 12 is filled with information first. In order to generate the respective "filling" information, a predetermined function (which will be explained in detail below) is applied to a row of thirteen (which is an example) pixels 14 adjacent to the occlusion pixel 12. The respective pixels 14 are surrounded by a thicker line and this rectangle 16 is referenced as a filter aperture 18. The filter aperture 18 has a rectangular shape and "selects" thirteen pixels in the pixel matrix 20. It is apparent that the filter aperture 18 is just a pictural representation of a process of selecting certain pixels out of the pixel matrix 20. The pixel values of the selected pixels 14 within the filter aperture 18 are processed and yield a pixel value which is assigned to the occlusion pixel 12. As a result, the occlusion pixel 12 has now picture information which correlates to the picture information of the pixels 14 selected by the filter aperture 18.

In a next step, which is shown in FIG. 2b, the filter aperture 18 is shifted by one row within the pixel matrix 20 so that different pixels 14 are selected. The pixel values of these selected pixels are processed in the same way as before and the result of this process is assigned to the occlusion pixel 22 which is one row below the pixel 12 filled in the former step.

In the next step, which is shown in FIG. 2c, the filter aperture 18 is shifted by one column to the right in the filter matrix 20 so that the filter aperture 18 now also selects a pixel 22 which has been filled with pixel information in the step before. The respective selected pixels are processed in the same way and the result is assigned to the next occlusion pixel 24 indicated by a black square.

This process of shifting the filter aperture 18 into a position in which one selected pixel is adjacent to an occlusion pixel is repeated until all occlusion pixels within the occlusion area 10 are filled with pixel information.

FIG. 2d shows the last step for filling the occlusion pixel 26. All other occlusion pixels within the occlusion area 10 have been filled with pixel information in the steps before.

It is for example apparent from FIG. 2d that the filter aperture 18 selects four pixels (indicated as grey squares) which have been filled with pixel information in any of the steps before.

When shifting the filter aperture 18 from one position to the next it is important that all the selected pixels contain information that is in other words that the filter aperture 18 should not select an occlusion pixel (containing no information).

The description above indicates that it is a pixel by pixel process to fill the occlusion area 10 with pixel information. Hence, the number of "filling" steps corresponds to the number of pixels within the occlusion area.

Figure 2:
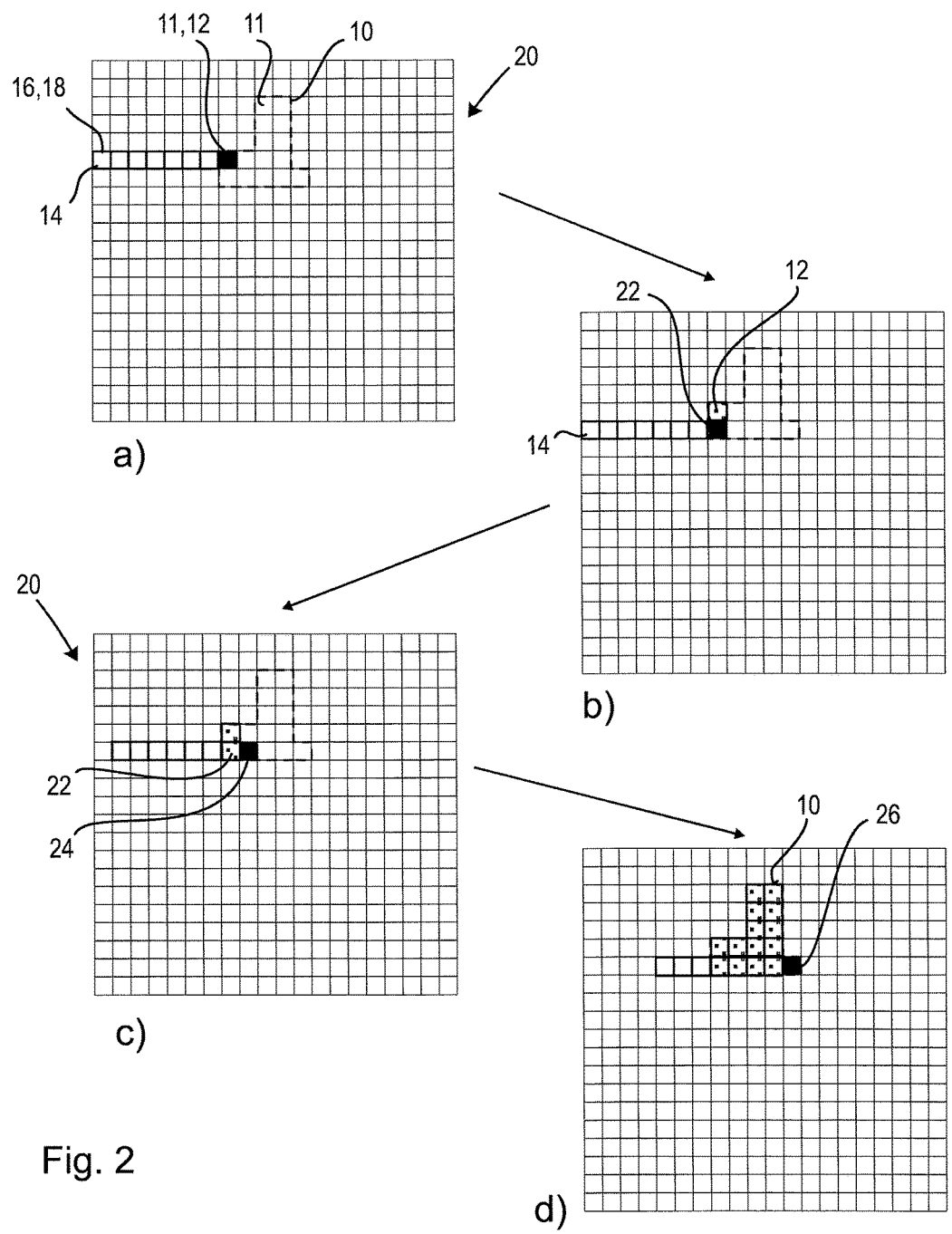
FIG. 2 shows schematically the "filling" process according to the present invention.

Further, it is apparent that FIG. 2 is merely an example for illustrating the steps of filling occlusion areas. The shape of the occlusion area as well as the number of occlusion areas within the pixel matrix could be different and is not limited to the present example.

Figure 3:
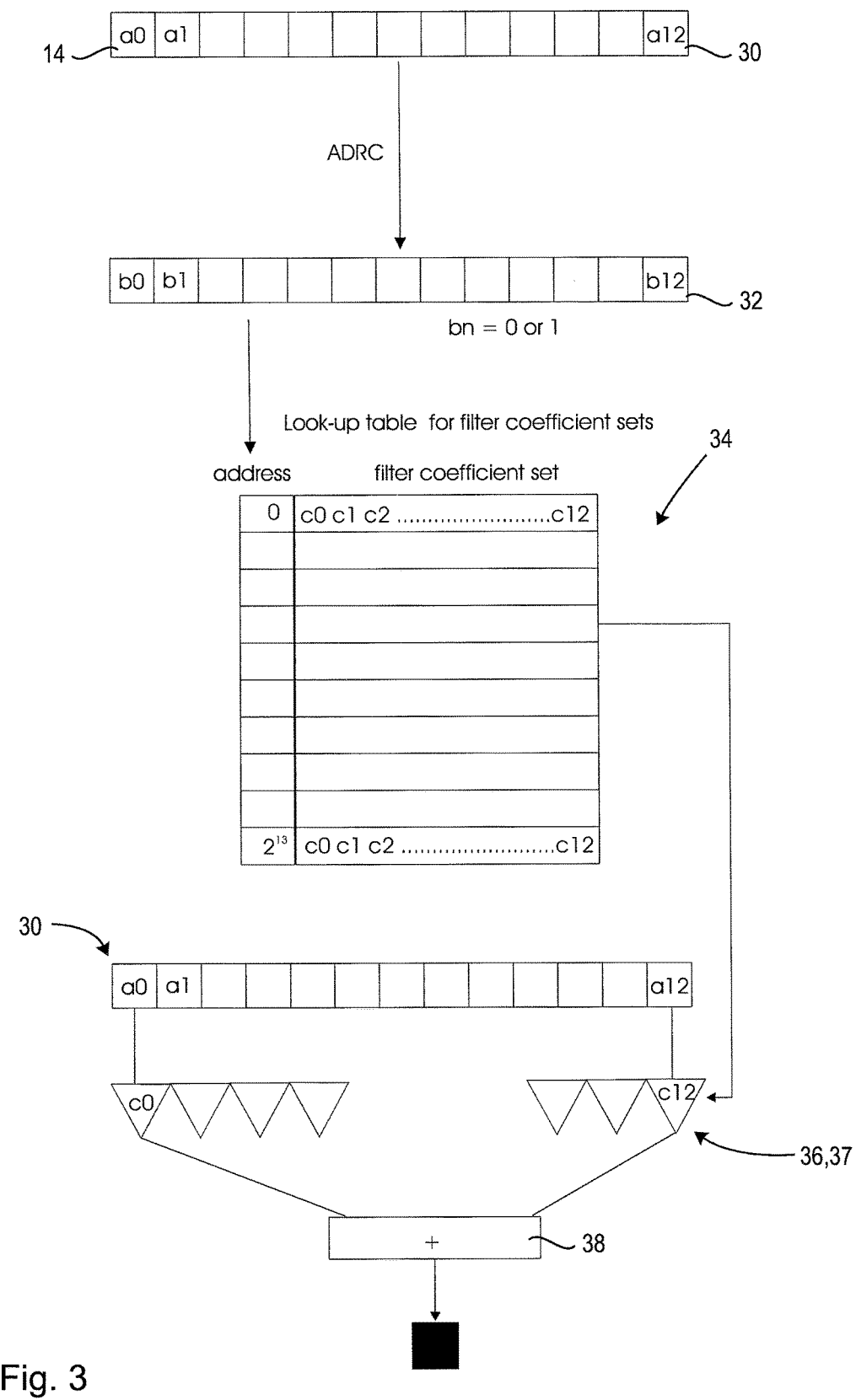
FIG. 3 shows by way of example the function used to generate new pixel information.

As mentioned above, the pixels selected by the filter aperture 18 are processed in a certain way. This process is now described with reference to FIG. 3.

The values of the selected pixels 14 are stored in a register which is indicated with reference numeral 30. In the register 30, the pixel values of all thirteen pixels 14 are stored, the pixel values being indicated by the reference characters a0-a12.

The pixel values a0-a12 are classified by applying a function which is generally known as adaptive dynamic ranging coding (ADRC). Detailed descriptions of this function may be found in the paper "Simultaneous coding artefact reduction and sharpness enhancement", H. Hu and G. de Haan, Philips Research Laboratories, Eindhoven, The Netherlands, "Trained Bilateral Filters and Applications to Coding Artifacts Reduction", H. Hu and G. de Haan, Philips Research Laboratories, High Tech Campus 36, Eindhoven, The Netherlands or "Class-Count Reductions Techniques for Content Adaptive Filtering", H. Hu and G. de Haan. Further, it is referred to U.S. Pat. Nos. 5,444,487, 6,192,161 B1 and 6,323,905 B1. The content of each of these documents is incorporated by reference herewith.

This ADRC function classifies each of the pixel values a0-a12 and the result is a binary value 0 or 1 which is stored in a corresponding register 32. One possibility to classify a pixel value $a_i$ is for example:

$$ADRC(a_i) = \begin{cases} 0, \text{ if } a_i < \frac{a_{max} + a_{min}}{2} \\ 1, \text{ otherwise} \end{cases}$$

where $a_{max}$, $a_{min}$ are the maximum and minimum pixel value in the filter aperture, that is in the register 30.

As a result of this ADRC function, the register 32 stores a binary value with 13 binary digits b0-b12.

This binary value is used as an address into a look-up table 34 which comprises a plurality of filter coefficient sets. Each filter coefficient set comprises thirteen filter coefficients c0-c12 which are used for an adaptive filter indicated with reference numeral 36.

The pixel values a0-a12 stored in the register 30 are applied to the filter 36, the filter being set by the filter coefficient set addressed by the binary value stored in the register 32.

In detail, the pixel a0 is multiplied with the filter coefficient c0, the pixel value a1 with the filter coefficient c1, and so on until the pixel value a12 which is multiplied by the filter coefficient c12. The respective results of the filtering step are supplied to an adder 38 and the result is taken to fill the occlusion pixel.

To sum up, the pixel values of the filter aperture 18 are classified by using a certain function, for example the ADRC function as to get an address into a look-up table of filter coefficient sets. The addressed filter coefficient set is then used to adjust a filter 36 to which the pixel values a0-a12 are supplied. The results of the filtering step are summed and the result is then the pixel value for the occlusion pixel.

The look-up table preferably contains $2^n$ (wherein n is the number of pixels selected by the filter aperture 18) filter coefficient sets, each filter coefficient set comprises n filter coefficients. The look-up table is generated in a trainings process which will be briefly described below.

Figure 4:
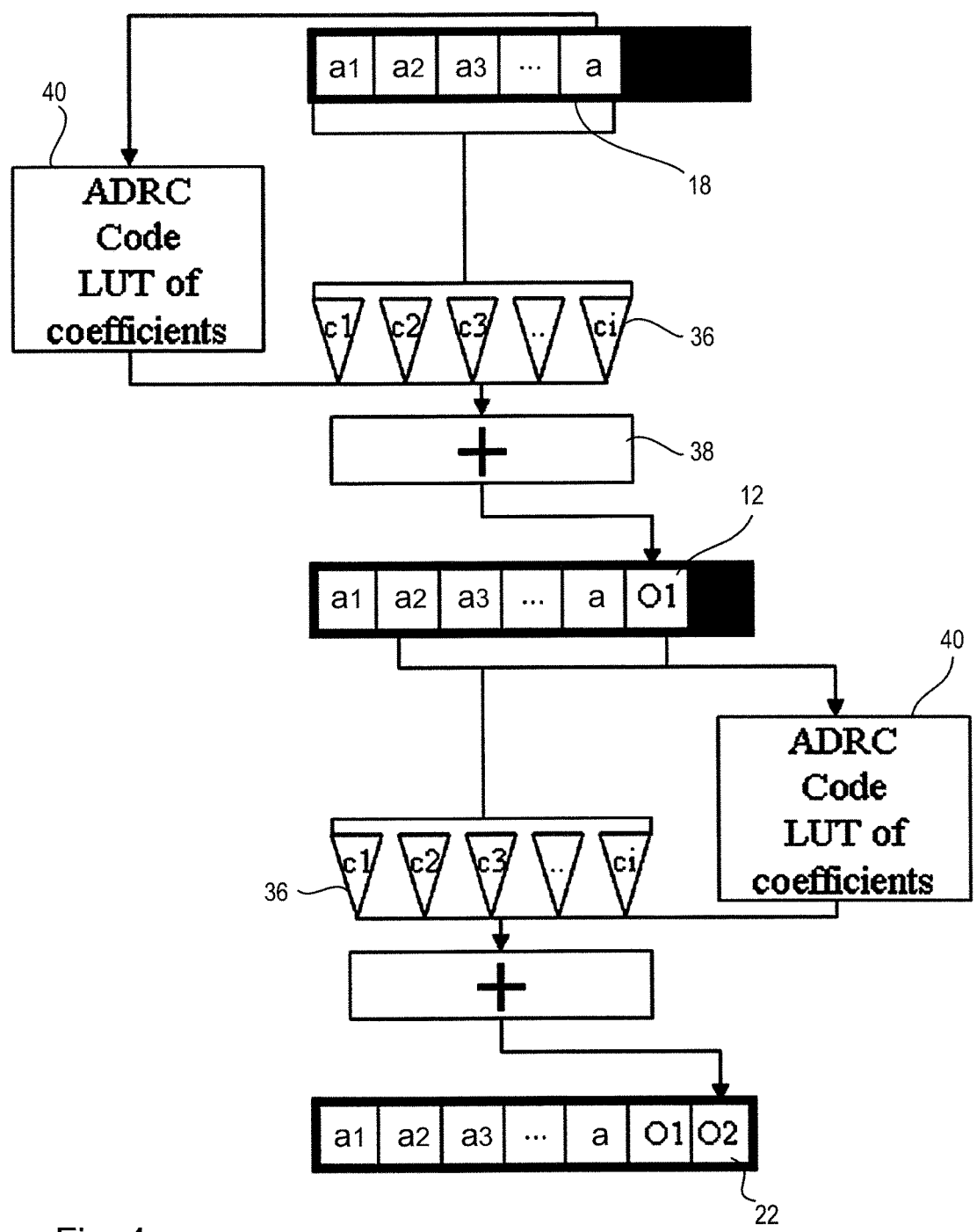
FIG. 4 is a block diagram for explaining the step of filling an occlusion pixel with information.

The above-mentioned process is schematically indicated again in FIG. 4. In a first step, the pixel values a1-ai selected by the filter aperture 18 are supplied to a classification unit 40 which applies the ADRC function and supplies a respective filter coefficient set from the look-up table 34 to the filter 36. The outputs of the filter 36 are then summed and the result O1 is filled in the respective occlusion pixel 12.

Next, the filter aperture 18 is shifted by one pixel so that the pixel values a2-ai and O1 are supplied to the classification unit 14 and the filter 36 which is adjusted by the filter coefficients provided by the look-up table 34. The output of the filter is summed. The output O2 is then used to fill the next occlusion pixel 22.

As already mentioned before this process is repeated as long as there are still occlusion pixels not being filled with a pixel value.

The filter coefficient sets stored in the look-up table 34 are yield in a trainings process, which is generally known and disclosed for example in the above mentioned documents, the content of which is incorporated by reference herewith also with respect to the trainings process.

Figure 6:
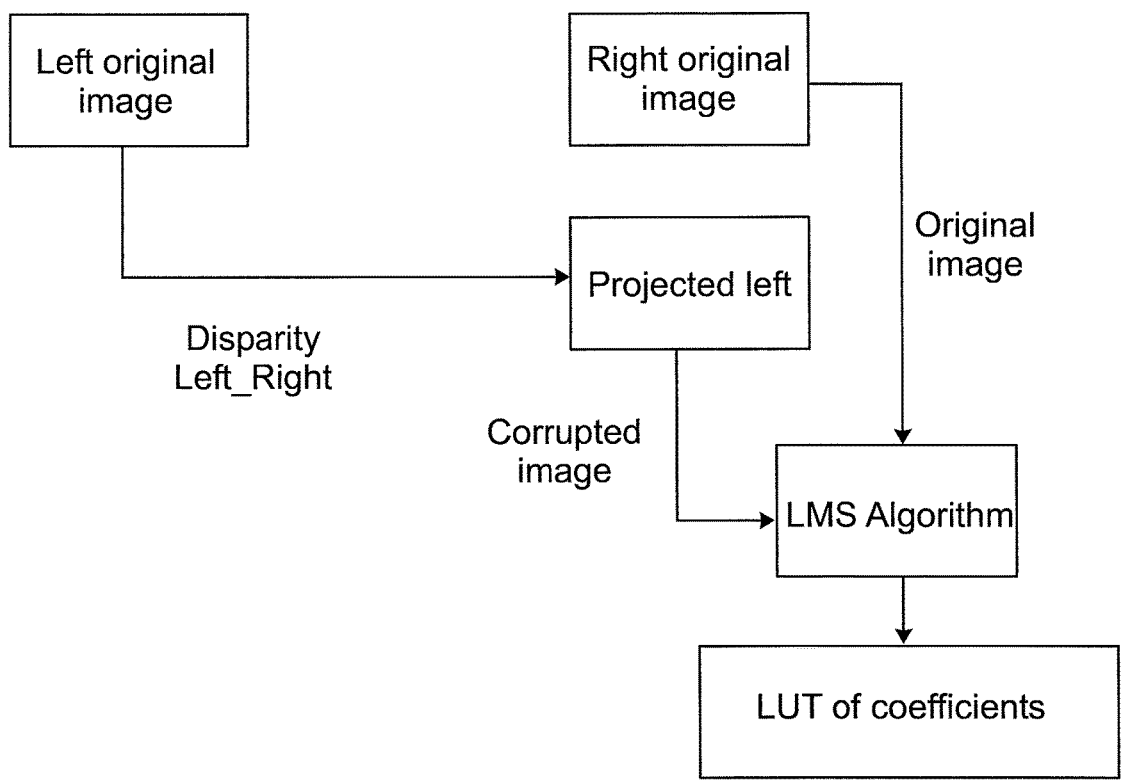
FIG. 6 is a block diagram for explaining the trainings process.

In a trainings cycle, a projected image of view is calculated on the basis of the original image and a disparity map. For example as shown in FIG. 6, the left original view, the right original view and the disparity map are given, and a projected left image of view is calculated on the basis of the left original image and the disparity map. The projected left image and the original right image are supplied to an LMS algorithm (Least Mean Squares) and the output of this algorithm is stored in the look-up table of filter coefficient sets.

Figure 5:
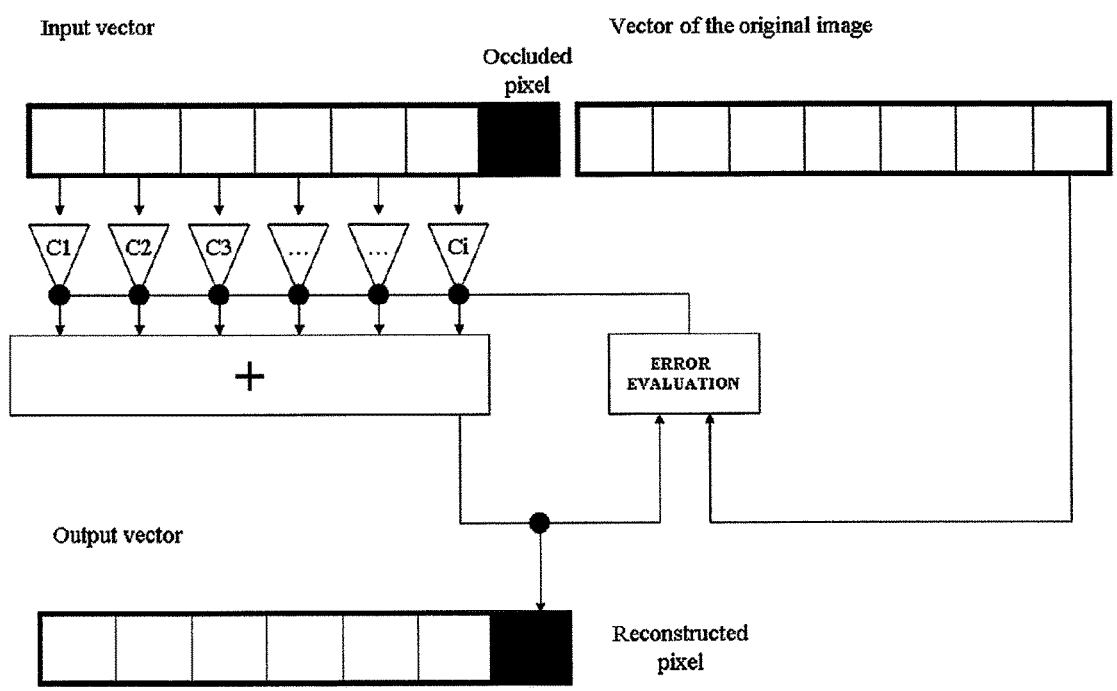
FIG. 5 is a block diagram for explaining the trainings process for generating a look-up table.

In FIG. 5, a schematic block diagram is shown for explaining in a very simplified manner the function of the LMS algorithm. The pixel values designated as input vector are coming from the projected image whereas the vector of the original image comes from the right original image. Briefly summarized the filter coefficients c1-ci are adjusted such that the error between the output of the adder designated as reconstructed pixel and the respective pixel in the vector of the original image becomes minimal. Then, the respective filter coefficients are stored in the look-up table using an address which is gained from the input vector by using the ADRC function.

This trainings process or cycle should be carried out for as much pictures as possible.

The look-up table can be generated once by a trainings process, and the gained filter coefficient sets can be used as prestored values in the respective devices. It is not necessary to carry out the trainings process for each device equipped with a look-up table.

As mentioned before, a device comprising the units mentioned before and being adapted to perform the described method for filling occlusion pixels can be used in auto-stereoscopic systems or could be used in depth modifications methods, just to mention two applications. It goes without saying that further applications are conceivable.

The embodiment described above uses the same number of pixels n for the classifying step and the filtering step. However it is also conceivable that the classifying step uses more or less pixels than the filtering step. Dependent on the number of pixels used for the classifying step, the size of the look-up table is greater than $2^n$ rows or smaller. For example, it would be possible to have a smaller aperture for selecting the pixels for the classifying step, e.g. nine pixels. This results in a look-up table having $2^9=512$ rows of thirteen filter coefficients.

The invention has bee illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. Method for generating an intermediate view on the basis of left and right views of a 3D picture and a disparity map, the method comprising:
    using pixel information contained in the left and right views and the disparity map for creating the intermediate view,
    identifying occlusion pixels in the created intermediate view, and
    filling each of the occlusion pixels with information calculated from values of a plurality of adjacent pixels, wherein said adjacent pixels are a number of n pixels in a line (indicated by a filter aperture), wherein the values of said n pixels are filtered to obtain a new single value which is assigned to the occlusion pixel, wherein each value of said n pixels is filtered individually using an individual pre-stored filter coefficient of a filter coefficient set, wherein a plurality of filter coefficient sets is stored in a look-up table, wherein the filter coefficient set to be used for filtering is determined on the basis of the values of a number w of pixels, wherein said plurality of filter coefficient sets in the look-up table are obtained by a trainings process, and wherein said number of w pixels used for classifying and the number of n pixels used for filtering are equal, and
    applying an ADRC (adaptive dynamic ranging coding) function for classifying the values of the w pixels.

2. Method of claim 1, wherein the step of filling the occlusion pixels with information is carried out pixelwise.

3. Method of claim 1, wherein said classified values of the w pixels are used as an index to the look-up table.

4. Method of claim 3, comprising the step:
    applying said filter coefficient set from the look-up table on the n pixels and summing the filter results to obtain a new pixel value for the occlusion pixel.

5. Method of claim 1, wherein the method is repeated for every occlusion pixel.

6. Device for generating an intermediate view on the basis of left and right views of a 3D picture and a disparity map, comprising:
    circuitry configured to
    store a number of n and w pixel values, wherein said number n and said number w are equal,
    implement a filter having n filter coefficients,
    determine a classified value on the basis of the w pixel values,
    store a look-up table comprising a plurality of filter coefficient sets and adapted to be addressed by the classified value and to provide a set of n filter coefficients to the filter, and
    fill an occlusion pixel in the intermediate view with the result value of the filter such that the occlusion pixel is filled with information calculated from values of a plurality of adjacent pixels, wherein said adjacent pixels are a number of n pixels in a line (indicated by a filter aperture), wherein the values of said n pixels are filtered to obtain a new single value which is assigned to the occlusion pixel, wherein each value of said n pixels is filtered individually using an individual pre-stored filter coefficient of one of said filter coefficient sets, wherein the filter coefficient set to be used for filtering is determined on the basis of the values of a number w of pixels, and wherein said plurality of filter coefficient sets in the look-up table are obtained by a trainings process.

7. Device of claim 6, wherein the circuitry is further configured to create an intermediate view on the basis of left and right views of a 3D picture and a disparity map.

8. Device of claim 7, wherein the circuitry is further configured to identify occlusion pixels in said intermediate view.

9. Device of claim 6, wherein the circuitry is further configured to carry out an adaptive dynamic ranging coding function (ADRC) for classifying the stored n and w pixel values.

10. Device of claim 6, wherein said look-up table comprises at least $2^w$ filter coefficient sets.

11. Device of claim 6, wherein said filter comprises a recursive filter.

12. Device of claim 6, wherein said device is part of a 3D auto-stereoscopic system.

13. Method for generating an intermediate view on the basis of left and right views of a 3D picture and a disparity map, the method comprising:
    using pixel information contained in the left and right views and the disparity map for creating the intermediate view,
    identifying occlusion pixels in the created intermediate view, and
    filling each of the occlusion pixels with information calculated from values of a plurality of adjacent pixels, wherein said adjacent pixels are a number of n pixels in a line (indicated by a filter aperture), wherein the values of said n pixels are filtered to obtain a new single value which is assigned to the occlusion pixel, wherein each value of said n pixels is filtered individually using an individual pre-stored filter coefficient of a filter coefficient set, wherein a plurality of filter coefficient sets is stored in a look-up table, wherein the filter coefficient set to be used for filtering is determined on the basis of the values of a number w of pixels, wherein said plurality of filter coefficient sets in the look-up table are obtained by a trainings process, and wherein said number of w pixels used for classifying and the number of n pixels used for filtering are unequal, and
    applying an ADRC (adaptive dynamic ranging coding) function for classifying the values of the w pixels.

* * * * *